United States Patent Office.

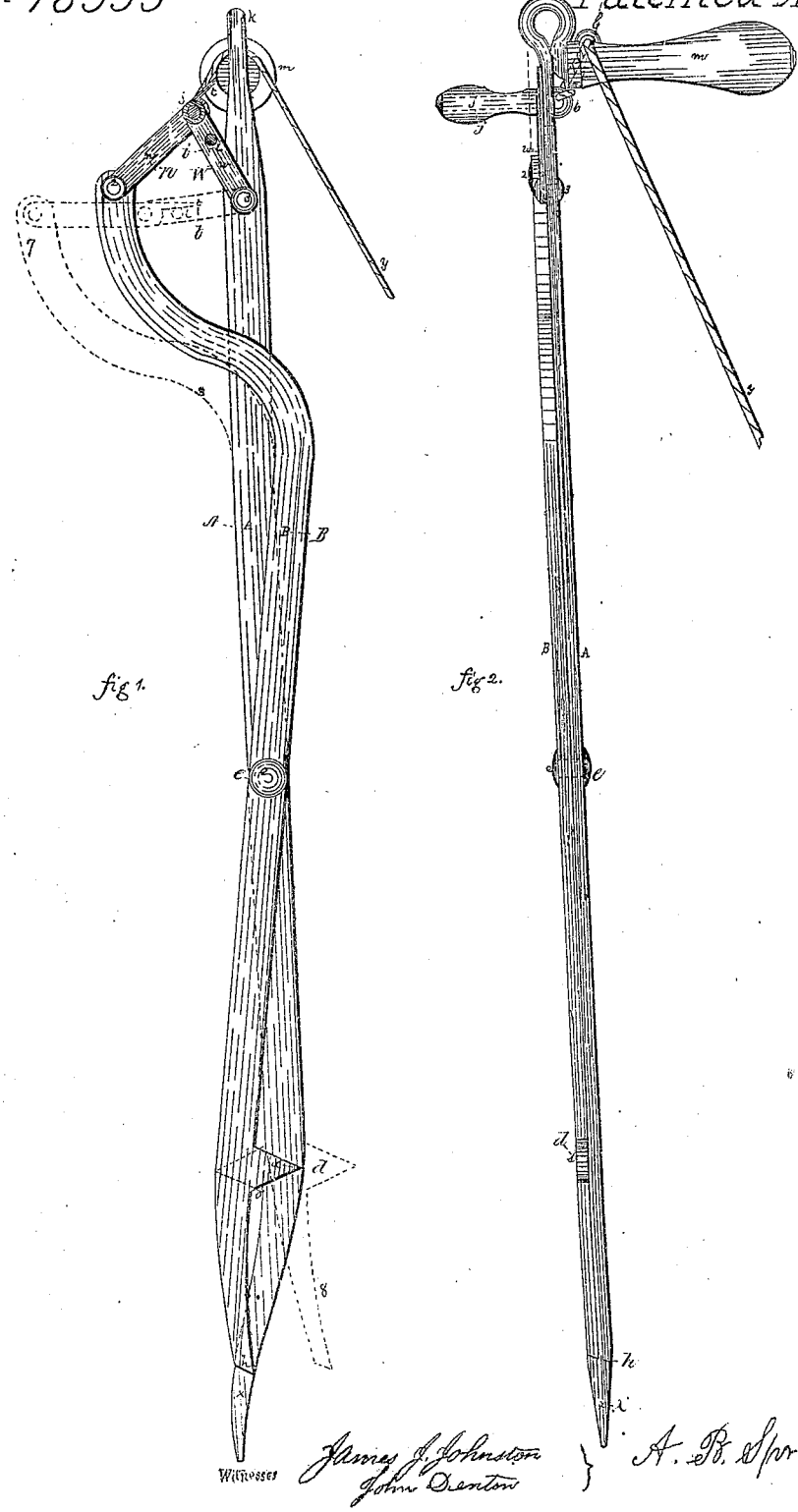

ARIEL B. SPROUT, OF HUGHESVILLE, PENNSYLVANIA.

Letters Patent No. 78,335, dated May 26, 1868.

IMPROVEMENT IN HORSE HAY-FORKS.

*The Schedule referred to in these Letters Patent and making part of the same.*

TO ALL WHOM IT MAY CONCERN:

Be it known that I, ARIEL B. SPROUT, of Hughesville, in the county of Lycoming, and State of Pennsylvania, have invented a new and useful Improvement in Hay-Elevators; and I do hereby declare that the following is a full and exact description thereof, reference being had to the accompanying drawings, and to the letters of reference marked thereon.

My invention consists in the use of two rods or bars, armed with barbs or prongs, and hinged together near the centre, and spread out or contracted by means of a jointed lever, operating in the manner hereinafter described.

To enable others skilled in the art to make and use my invention, I will proceed to describe its construction and operation.

In the accompanying drawings—

Figure 1 represents a front elevation of my improved hay-elevator when closed and ready to enter the hay.

Figure 2 represents a side elevation of the same.

In the drawings, A and B represent two rods or flat bars of iron or steel, furnished with barbs or prongs, marked $d$ and $o$. Said rods or flat bars and their barbs or prongs are made substantially in the form represented in the drawings, and are hinged together at the point marked $e$ by means of a suitable bolt or rivet.

The rod or bar A is furnished with a handle, $m$, and a loop, $k$, for the rope used for hoisting. To the upper end of the rod or bar B is attached (at 2) a lever, $n$, furnished with a point, marked $t$. Near the upper end of the rod or bar A is attached (at 3) a lever, $w$, furnished with a stop, marked $i$. These two levers are hinged together by the rod in handle $j$, which is used for operating said levers. To rod 6, of the handle $j$, is attached a cord, $y$, which passes through an eye in the handle $m$. The point $x$, of rod or bar A, is furnished with a groove or offset for the point $h$ of the rod or bar B, so that the point $h$ will not catch in entering the hay.

The operation of the hay-elevator is as follows: When the various parts are in the position represented in figs. 1 and 2, the elevator is forced down into the hay by means of handle $m$, and the bars A and B are spread out by pressing on handle $j$ until the levers $n$ and $w$, and the bar B, assume the position represented by the dotted lines 7 and 8. The elevator and its load of hay are raised to the place desired, and are unshipped by drawing on cord $y$, which will bring the various parts into the position represented in figs. 1 and 2.

I claim—

1. A hay-elevating fork, provided with a penetrating point, and with rigid barbs, hooks, or spurs, operating substantially as described.

2. A hay-elevating fork, having barbs, hooks, or spurs, which are thrust into and withdrawn from the hay, or equivalent material to be raised, by a lateral movement, relative to each other, of the bars to which said barbs or hooks are attached.

3. A hay-fork, provided with rigid barbs or hooks, which are covered when the fork is to be inserted into or released from the hay, and uncovered after the fork has been inserted, for raising the hay.

4. A hay-fork, composed of bars having a lateral or shear-blade movement relative to each other, a penetrating point, barbs or hooks, and a mechanism or device for operating the bars and hooks, to cause them to seize and hold or release the load, as desired.

5. Giving to the holding-hooks or spurs a lateral and upward movement or thrust, by means of toggle-links or levers connected therewith, for the purpose of operating said hooks, substantially as described.

A. B. SPROUT.

Witnesses:
JAMES J. JOHNSTON,
ALEXANDER HAYS.